United States Patent [19]

Hinshaw et al.

[11] 4,279,078
[45] Jul. 21, 1981

[54] FLUID PRESENCE DETECTOR

[75] Inventors: Stanley E. Hinshaw; Charles F. Cole, Jr., both of Ponca City, Okla.

[73] Assignee: Conoco, Inc., Ponca City, Okla.

[21] Appl. No.: 120,946

[22] Filed: Feb. 12, 1980

[51] Int. Cl.³ ............................................. G01F 23/04
[52] U.S. Cl. ................................ 33/126.5; 73/304 R; 340/620
[58] Field of Search ............... 73/304 R; 340/59, 620; 33/126.5

[56] References Cited
U.S. PATENT DOCUMENTS

| | | | |
|---|---|---|---|
| 2,480,490 | 8/1949 | Mark, Jr. | 340/620 |
| 2,593,252 | 4/1952 | Booth | 340/620 |
| 3,909,948 | 10/1975 | Markfelt | 33/126.5 |

Primary Examiner—Donald O. Woodiel
Attorney, Agent, or Firm—William J. Miller

[57] ABSTRACT

A fluid level indicator circuit is used in cooperation with a probe attached to a long wire where the probe has first and second electrodes for contacting the surface of the fluid and leads communicating to the indicator circuit. The water level indicator has a low current high gain transistor and a power source which has sufficient potential to not only properly reverse bias the transistor when the probes are out of contact with the fluid but also properly forward bias when the probes are in contact with conductive fluid. A meter and current adjusting device are provided in series with a collector and emitter to provide an indicator when the probes are in or out of the water. The circuit also has a light to give a visual indication.

2 Claims, 2 Drawing Figures

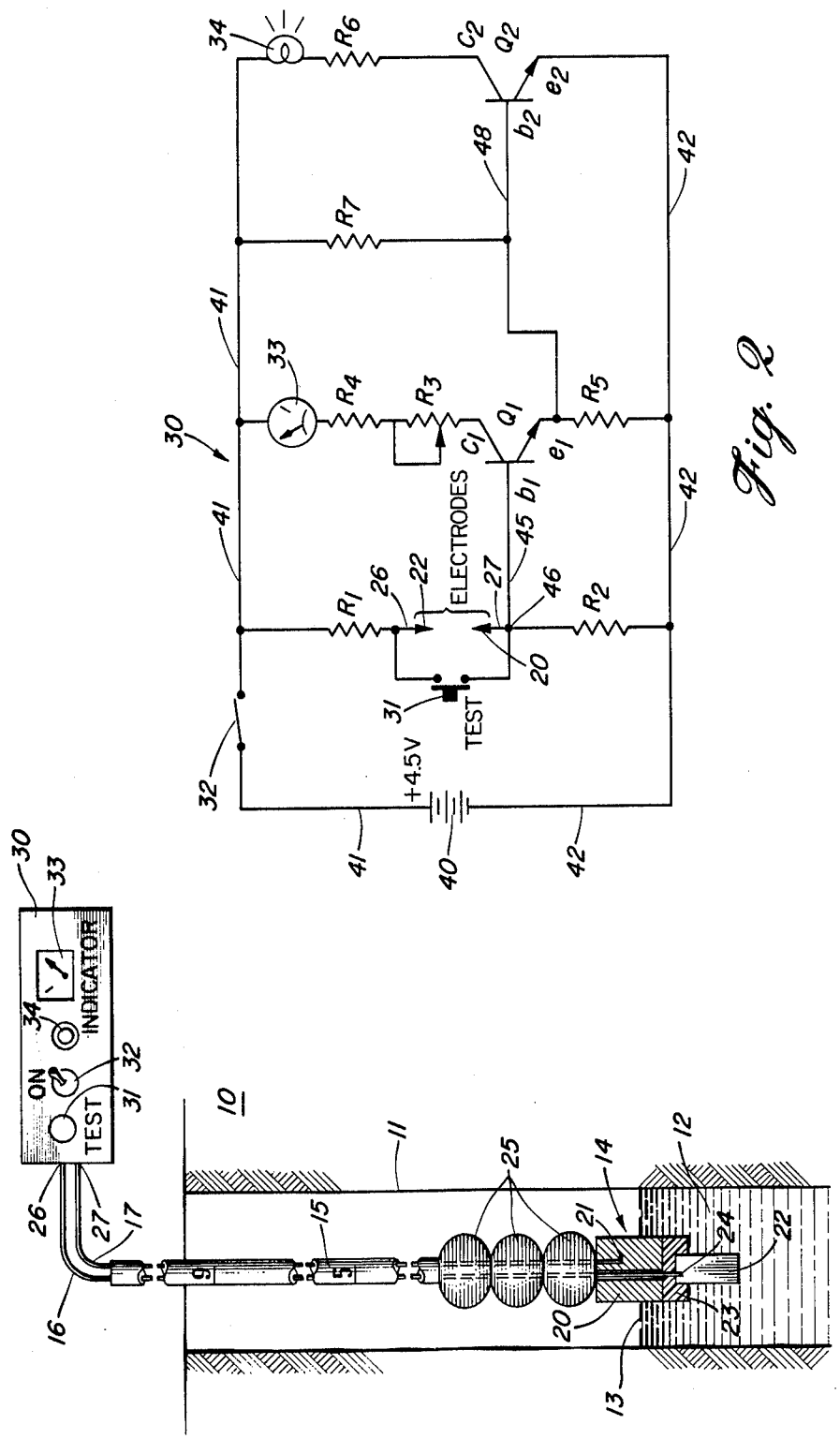

FLUID PRESENCE DETECTOR

PRIOR ART

Fluid level indicators in the past had several major problems. First, the transistor circuits were not sensitive enough to determine fluids which has a high resistance and, second, the circuits were not sufficiently stable so that the indicator remained in an "off" position when the probes were out of the fluid. These circuits habitually malfunctioned when the probe was inserted into the water, for example, and removed. The circuit often would not return to zero indicating the probe has been removed from the water, thereby leading to an error in the measured depth of the water.

BACKGROUND OF THE INVENTION

It is often necessary to measure the depth of water as required by enviromental consideration. For example, an oil well drilled in an area or mining taking place in a location must not disturb, in many occasions, the surface waters of the region. In order to establish that the surface waters are unchanged, it is often necessary to measure the depth of the existing water level in existing holes or holes bored into the surface of the earth for accomplishing the test. A probe is dropped into the hole with the line supporting the probe having marks on the line indicating the depth of the probe in the hole. Once the probe strikes the water, the indicator should indicate the presence of the water. When the probe is withdrawn from the surface of the water, the indicator should indicate this fact. Measurements are made on several locations over the surface of the earth to determine the variations in water level as a consequence of the work being done in the area to establish that either there has been no change as a consequence of the work or to assess the amount of change if some did occur.

BRIEF DESCRIPTION OF THE INVENTION

This invention describes an indicator circuit connected to the standard probe previously described. The circuit includes a high gain transistor with adequate voltage to properly bias the transistor to cutoff when the electrodes are out of the water and to properly forward bias the transistor when the electrodes are in the water, even when the water or other fluid has very high resistivity (exceeding seven megohm-meters). The indicator circuit comprises both a meter which has a full scale deflection showing that the surface of the water has been reached and a light which provides visual indication of the surface of the water being reached.

BRIEF DESCRIPTION OF THE FIGURES

FIG. 1 is a cross-sectional view of a hole bored into the surface of the earth illustrating water having a surface therein and a probe inserted into the water connected to an indicator apparatus; and, FIG. 2 is the electronic circuitry in the indicator apparatus illustrated in FIG. 1.

DETAILED DESCRIPTION OF THE INVENTION

Referring to FIG. 1 the surface of the earth 10 has a hole 11 formed therein. Water or other fluid 12 is partially filling the hole and has a surface 13. A probe, generally referred to by arrow 14, is inserted into the hole and to the surface of the water 13. Probe 14 is supported by a wire line 15 which has a pair of conductors 16 and 17 therein. The probe 14 generally comprises a weight 20 usually made of lead and functions as one of the electrodes. Wire 17 is illustrated attached to electrode 20 at a point 21. A second electrode 22 is attached to electrode 20 by an insulator 23. Conductor 16 is connected to electrode 22 at point 24. In order to ease the lowering of the wire line 15 into the hole, a plurality of lead weights 25 is attached to the line, sufficient number being attached thereto to provide adequate weight. Conductors 16 and 17 are attached to test set 30 and inputs 26 and 27. Test set 30 includes a test button 31, an on/off switch 32, a meter conductor 33, and a visual light indicator 34.

The operation of the device shown in FIG. 1 is as follows:

Wire line 15 is lowered into hole 11 until electrode 22 enters water 12 and electrode 20 strikes the surface 13 of water 12. As previously mentioned weights 25 assist in lowering the probe into hole 11. Once electrode 20 strikes the surface 13 of water 12 the circuit is completed between electrodes 22 and 20. This fact is communicated into the conductors 16 and 17 to inputs 26 and 27, respectively, of indicator circuit 30. With switch 32 in the "on" position the indicator 33 will swing from the "off" position to the full scale deflection as illustrated and indicator light 34 will illuminate. The depth of the surface of the water can then be read by observing the numeral, for example 9, on wire line 15 which will indicate the number of feet from the surface of the water to the surface of the earth. The wire line can be moved up and down to ascertain exactly the point conductor 20 enters water surface 13.

The electronic circuitry for indicator circuit 30 is illustrated in FIG. 2 and generally comprises a battery 40, a first transistor $Q_1$ which has a collector $c_1$, and emitter $e_1$ and base $b_1$ and a second transistor $Q_2$ having its collector $c_2$, emitter $e_2$, and base $b_2$. Positive potential for the circuit is supplied from battery 40 to conductor 41 which is applied through switch 32. A negative potential to the circuit is supplied through conductor 42. Electrode 22 is coupled through a resistor $R_1$ to conductor 41 and electrode 20 is coupled through resistor $R_2$ to negative conductor 42. A test circuit is provided by test button 31 which is connected directly across electrodes 22 and 20 which basically shorts out the inputs 26 and 27 of test circuit 30. The collector $c_1$ of transistor $Q_1$ is coupled through an adjusting resistor $R_3$ and a second resistor $R_4$ through indicator 33 to positive conductor 41. The emitter $e_1$ is coupled through resistor $R_5$ to negative conductor 42. The base $b_1$ is connected through a conductor 45 to the junction 46 which is connected to the input 27 of electronic circuit 30. The collector $c_2$ of transister $Q_2$ is connected through resistor $R_6$ and light 34 to positive conductor 41. Emitter $e_2$ of transistor $Q_2$ is connected directly to conductor 42. Base $b_2$ is connected to emitter $e_1$ of transistor $Q_1$ through conductor 48 and through resistor $R_7$ to positive conductor 41.

The circuit operates in the following manner:

Transistor $Q_1$ is a low current high gain transistor and must have a gain of no less than 100 and should preferably be around 300. Battery voltage 40 must be high enough so that transistor $Q_1$ has sufficient reverse bias when the electrodes 22 and 20 are out of the water transistor $Q_1$ will be cutoff. The battery voltage must also be high enough so that when the electrodes are in the water $Q_1$ will be fully conductive; that is, the collector to base potential must be sufficient to draw current from the emitter through the base to the collector junction. Resistor $R_2$ must be high enough to drive the base $b_1$ of transistor $Q_1$ to full conduction when electrodes 20 and 22 are in the water and yet low enough to rapidly drive the base to cutoff when the electrodes are removed from the water; therefore, when electrodes 20 and 22 are out of the water, $R_2$ will bias the base $b_1$ of transistor $Q_1$ to cutoff. No current will then be passing between the collector $c_1$ and emitter $e_1$ and meter 33 will be in the no current position as illustrated. When the electrodes 20 and 22 are inserted into the water a resistance will be effectively passed between the electrodes 20 and 22 by virtue of the resistance or conductivity of the water. The water should at least have the conductivity of deionized water. The resistance thus developed between electrodes 20 and 22 will cause a current to flow through resistors $R_2$ and $R_1$. The voltage then developed at junction 46 will drive base $b_1$ sufficiently positive so that transistor will be fully conductive. Resistor $R_4$ is selected to provide full meter reading and may be further adjusted by $R_3$ so that when $Q_1$ is fully conductive the hand of meter $R_3$ will move to the line indicated on the face. Once the electrodes 20 and 22 are removed the voltage developed across $R_2$ will drive the base $b_1$ to cutoff. As a further indication means, since the tests may be run at night, there is provided transistor $Q_2$ and light 34. Voltage developed across resistor $R_5$ is connected through wire 48 to base $b_2$ of transistor $Q_2$, driving transistor $Q_2$ from cutoff to full conduction. Transistor $Q_2$ is a high current low gain transistor. When transistor $Q_2$ reaches conduction, current will pass through the light 34, resistor $R_6$, collector and emitter of transistor $Q_2$ to the battery 40, causing light 34 to light. When transistor $Q_1$ is again at cutoff, resistor $R_7$ and resistor $R_5$ provide a bias to the base $b_2$ which is sufficient to cutoff transistor $Q_2$.

A circuit built in the manner described and tested has the following components:

battery 40: 4.5 volts
$R_1$: 16,000 ohms
$R_2$: 18,000 ohms
indicator 33: 1 milliamp full scale
$R_3$: 1,000 ohms
$R_4$: 1,600 ohms
$R_5$: 1,000 ohms
$R_6$: 30 ohms
$R_7$: 51, ohms
indicator light: No. 49 light bulb
transistor $Q_1$: 2N3904
transistor $Q_2$: 2N3053

The circuit as above tested has provided extremely stable readings with instant indication as to the surface of the water, both in making contact with the surface and removing the probe from the surface. The electrodes are not critical and can be of any conductive material.

It is obvious that changes can be made in the application and still be within the spirit and scope of the invention as disclosed in the specification and appended claims.

What is claimed is:

1. A water level indicator circuit used in cooperation with a probe attached to a long wire, said probe having first and second electrodes for contacting the surface of the water with first and second leads communicating from said first and second elctrodes, respectively, to an input of said indicator circuit, an improved indicator circuit comprising:
   (a) a low current high gain transistor means having a collector, an emitter, and a base,
   (b) a power source having sufficient potential to properly reverse bias said low current high gain transistor means when said probe is not contacting said water and sufficient voltage to properly forward bias said low current high gain transistor means when said probe is contacting said surface of the water,
   (c) a meter,
   (d) current adjusting means,
   (e) means for coupling in series said power source, meter, current adjusting means and the collector and emitter of said low current high gain transistor, and
   (f) means for resistively coupling one of said electrodes to said power source and said remaining electrode to said negative terminal of said power source and to the base of said transistor through a resistance signal to bias said transistor to cutoff whereby when said electrodes are out of water said transistor is at cutoff and when said electrodes are in water said transistor is fully conductive.

2. A circuit as described in claim 1 additionally including a second transistor means having a collector, emitter, and base and wherein an incandescent illuminating means is connected between said power source through the collector and emitter of said second transistor and wherein said base is coupled to an output from said first transistor and biasing means connected between said power source and the base of said second transistor so that said second transistor is biased to cutoff in the absence of an output from said first transistor and to full conduction when said first transistor has an output.

* * * * *